United States Patent [19]

Farnworth et al.

[11] 4,287,098

[45] Sep. 1, 1981

[54] PROCESS FOR THE PRODUCTION OF EXHAUST GAS FILTERS

[75] Inventors: Frank Farnworth; Michael H. Clubley, both of Bolton, England

[73] Assignee: Texaco Limited, London, England

[21] Appl. No.: 124,685

[22] Filed: Feb. 26, 1980

[30] Foreign Application Priority Data

Feb. 28, 1979 [GB] United Kingdom ............... 06972/79

[51] Int. Cl.³ .............................................. B01J 21/04
[52] U.S. Cl. ................................................. 252/463
[58] Field of Search ......................... 252/463; 423/628

[56] References Cited

U.S. PATENT DOCUMENTS 3,231,520  1/1966  Leak et al. ........................... 252/463
3,362,783  1/1968  Leak ................................. 252/463 X Primary Examiner—W. J. Shine
Attorney, Agent, or Firm—Carl G. Ries; Robert A. Kulason; James F. Young

[57] ABSTRACT

A large scale method is provided for the production of exhaust and industrial gas filters comprising aluminium oxide produced by the decomposition of alumina hydrate deposited on a substrate.

A plurality of substrates are mounted on a stand, immersed in an alkali metal aluminate solution while the stand is subjected to motion through the solution, thereby causing the solution to flow over and through the substrates while alumina hydrate is deposited on them.

19 Claims, 3 Drawing Figures

PROCESS FOR THE PRODUCTION OF EXHAUST GAS FILTERS

BACKGROUND OF THE INVENTION

1. Field of the Invention

This invention relates to a method for the production of exhaust and industrial gas filters on a large scale.

In recent years, governments have become increasingly aware of the dangers to public health resulting from exhaust fumes of internal combustion engines, particularly in confined spaces. Among the constituents of exhaust gases which give rise to concern are carbon monoxide, incompletely-burnt hydrocarbons, nitrogen oxides and lead containing particulate matter. Regulations have been issued in many countries to reduce the amount of such emissions in exhaust gases. Attempts have been made to satisfy the requirements of such regulations in several ways:

(a) Internal combustion engines have been designed so that they operate in such a manner as to produce an inherently "cleaner" exhaust.

(b) Gasoline in which the added lead content is reduced or absent, is being sold on a wider scale than previously, and is mandatory in many areas.

(c) Attempts have been made to filter the exhaust, or to provide a catalyst which would lead to a more complete combustion of carbon monoxide and unburnt hydrocarbons.

While progress has been made with the first two of the methods set out above, they have the disadvantage that the development of a completely new engine for motor vehicles is extremely expensive so that manufacturers would wish, as far as possible, to continue to produce engines whose development has already largely been carried out. In addition, the production of lead-free petrol means that refineries would need to be run in a less efficient manner and use more crude oil than is possible when the octane rating of lower-octane hydrocarbons can be increased by the inclusion of lead compounds.

2. DESCRIPTION OF THE PRIOR ART

U.S. Pat. No. 3,231,520 and British Pat. No. 1,058,706 disclose a structure comprising a substrate having an adherent film or layer of alumina formed thereon which serves as a support for catalytic materials to promote a variety of reactions including the oxidation of exhaust gases from internal combustion engines. The alumina film is formed on a substrate of a metal or non-metal which may have a variety of configurations. The adherent alumina film is formed by contacting the substrate with a solution of an alkali metal aluminate forming a hydrated film of alumina on the substrate which is then dried and calcined to produce a hard tenacious film of predominantly gamma alumina. U.S. Pat. No. 3,227,659 discloses that the alumina-coated structure of U.S. Pat. No. 3,231,520, in addition to being a useful support for catalysts, may be impregnated with a phosphorus-containing material such as an alkali metal phosphate which is useful for the treatment of exhaust gases containing lead-containing particulate matter. U.S. Pat. No. 3,140,651 discloses that this structure may be impregnated with a chromium-containing material, such as an alkali metal or an alkaline earth metal chromate, for treating exhaust gases containing lead-containing particulate matter. U.S. Pat. No. 3,362,783 discloses a useful configuration of the alumina-coated structure wherein the substrate comprising metal wool is encased in a metal casing prior to coating with the alumina film so that the alumina coats not only the metal fibres, but also coats the casing thereby bonding the metal fibres to the inside of the casing. This particular structure was effectively employed in the treatment of exhaust gases when it was coated or impregnated with an oxidation catalyst. These alumina coated structures have the ability to withstand severe abrading and vibration which makes them particularly useful as a catalyst support for the treatment of automobile exhaust gases. Further use of these structures in this or other services may be desirable.

British Pat. No. 1,271,710 shows that alumina coated substrates may also be used on their own for the treatment of exhaust gases. It was found that the alumina itself acted as a filter to remove lead-containing particulate matter from the exhaust gases which could then be subjected to further treatment using a suitable oxidation catalyst, without this oxidation catalyst being rendered inactive by the lead.

In preparing the alumina-coated substrates in accordance with the various Patents described above, it was usual to deposit the alumina by immersing the substrate, which was generally formed from knitted metal mesh or wire, but could also comprise other forms, such as balls, bars, chains, plates or tubes. Generally, the alumina was deposited from a solution of an alkali metal aluminate. This can easily be generated by dissolving aluminum metal in an alkali metal hydroxide, most usually sodium hydroxide. The reactions involved in this process are as follows:

1. Dissolution of aluminum

$$2Al + 2H_2O + 2NaOH = 2NaAlO_2 + 3H_2$$

2. Decomposition on the wire

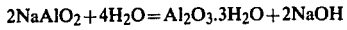
$$2NaAlO_2 + 4H_2O = Al_2O_3 \cdot 3H_2O + 2NaOH$$

The net overall reaction is:

$$2Al + 6H_2O = Al_2O_3 \cdot 3H_2O + 3H_2$$

As will be seen from these equations, the aluminum oxide is deposited in the form of the trihydrate (Gibbsite).

Generally, the film of aluminum oxide is at least 1 mil (0.025 mm) in thickness, and is preferably not less than about 10 mils (0.25 mm). Generally, a film thickness of from 10 to 100 mils (0.25 to 2.5 mm) is suitable.

After drying, the coated substrate is generally calcined at a temperature which is usually in the range from 285° to 820° C., more preferably from 540° to 820° C. This treatment dries off water of crystallization, and converts the aluminum oxide into the gamma-phase, which has a high surface area per unit weight and is very adsorptive.

The processes described in the prior art were suitable for the manufacture of small numbers of exhaust gas cartridges, but additional problems are encountered when attempts are made to manufacture such cartridges on a larger scale, which would be necessary if they were to be made a standard fitting for motor vehicles. In particular, it has been found that there is great difficulty in ensuring that substantially equal amounts of alumina are deposited upon the different cartridges in a batch. It is found, that when such cartridges are simply immersed in a solution of sodium aluminate, there was very considerable variation in the weight of alumina deposited upon individual cartridges. In some instances, twice as much alumina was deposited as in others.

Some improvement can be provided by the use of highly pure aluminum (99.99% purity) but this is twice as expensive as virgin aluminum (99.5% purity).

Belgian Pat. No. 849,373 notes certain of the difficulties encountered when attempting to carry out the coating process, and proposes a method in which the aqueous solution of alkali metal aluminate is formed by dissolving aluminum oxide in sodium oxide solution, and the composition of the alkali metal aluminate solution is adjusted during the course of deposition, by passing it through a regenerating device in which a weak solution of alumina, leaving the tank in which coating takes place, is concentrated by evaporation, and is regenerated by adding alumina, filtered and returned to the coating tank with the addition of a quantity of water which is equivalent to that evaporated in the regenerating system.

Such a process is quite complicated, involving evaporation and filtration of the solution. Moreover, the alkali metal aluminate is not generated directly from aluminum metal, but is instead formed from aluminum oxide and sodium oxide.

OBJECTS OF THE INVENTION

The object of the present invention is to provide a method by means of which coatings of aluminum oxide can be formed in a simple and convenient manner, while avoiding the various disadvantages of the prior art discussed above.

A further object of the invention is to provide a method for depositing coatings of aluminum oxide on substrates from a solution of alkali metal aluminate, such as sodium aluminate, without using complex and expensive means for the continuous regeneration and purification of said alkali metal aluminate solution.

Further objects of this invention will become apparent on further reading of this Specification.

SUMMARY OF THE INVENTION

The above stated objects of the invention can be achieved by a method for the production of exhaust gas filters comprising aluminum oxide produced by the decomposition of alumina hydrate deposited on a substrate contained within a metal casing, by depositing alumina hydrate from an alkali metal aluminate solution, which comprises mounting a plurality of said substrates upon a stand therefore, immersing said stand in said alkali metal aluminate solution, and subjecting said stand to motion through said alkali metal aluminate solution whereby said alkali metal aluminate solution is caused to flow over and through said substrates while alumina hydrate is deposited on said substrates.

Although it is possible to coat the substrates and then to insert the coated substrate within a metal casing, it is preferred to insert the substrate, which is preferably made from a metal wire, within the casing, before immersing the stand and filled casings in the alkali metal aluminate solution.

According to one embodiment of the invention, the alkali metal aluminate solution is obtained by dissolving aluminium metal in an alkali metal hydroxide solution.

According to another embodiment of the invention the alkali metal aluminate solution is obtained by dissolving alumina hydrate in an alkali metal hydroxide solution.

According to another embodiment of the invention, the alkali metal aluminate solution is obtained by dissolving bauxite or a bauxitic clay in an alkali metal hydroxide solution.

It has been found that the use of such a method for the production of exhaust gas filters, makes it possible to use aluminum of commercial purity in the generation of the alkali metal aluminate solution without the disadvantages previously encountered when using this material.

DESCRIPTION OF THE DRAWINGS

One embodiment of the invention will be illustrated by way of example in the accompanying drawings, in which.

DESCRIPTION OF THE PREFERRED EMBODIMENTS

Figure 1:
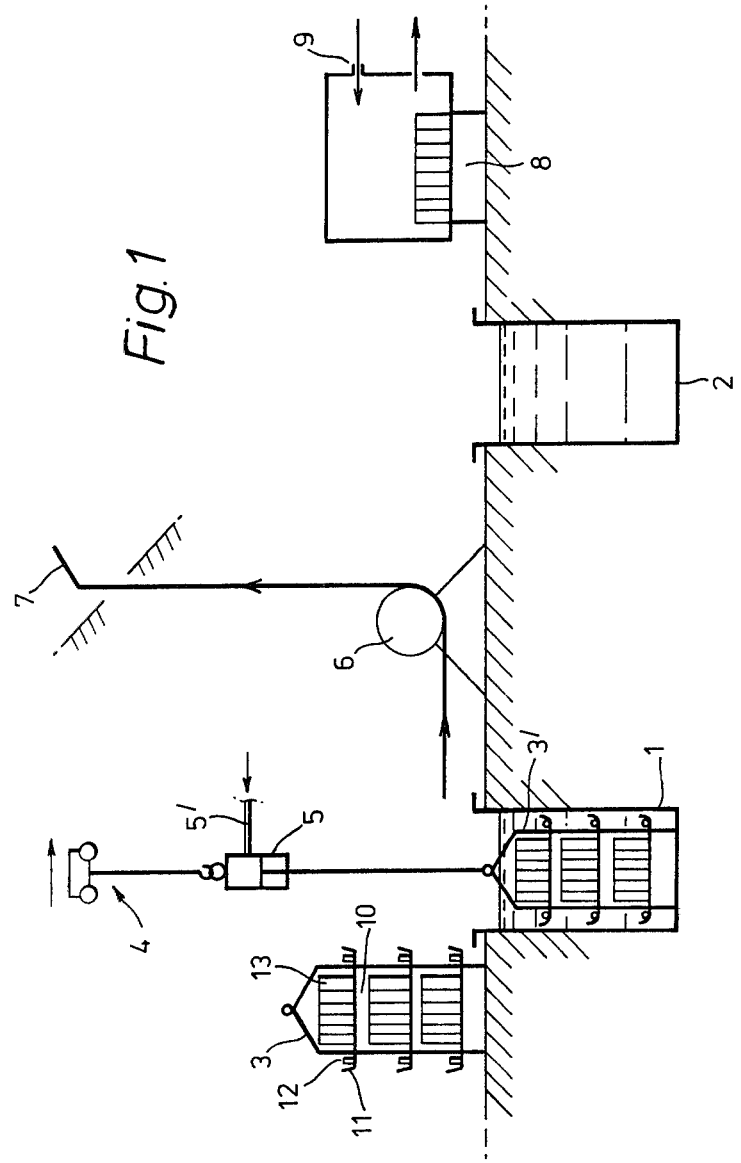
FIG. 1 is a general view of the apparatus.

The apparatus comprises a coating tank (1) and a wash tank (2). Each is provided with heating means (not shown) such as a means for injecting steam. Exhaust gas filters to be coated in tank (1) are supported on a stand (3) and a stand carrying filters in the process of being coated in tank (1) is identified as (3'). This stand (3') is supported from hoist (4) by means of a compressed air cylinder (5), to be discussed more fully below, fed with compressed air by means of line (5').

A fan (6) is provided to extract gaseous and liquid droplets from the vicinity of the coating and wash tanks, and this is vented to the atmosphere at (7). A furnace (8), fed with flammable gas (9) is provided to calcine the coated gas filters and to convert the aluminum oxide trihydrate into the gamma-phase, as described above.

Figure 2:
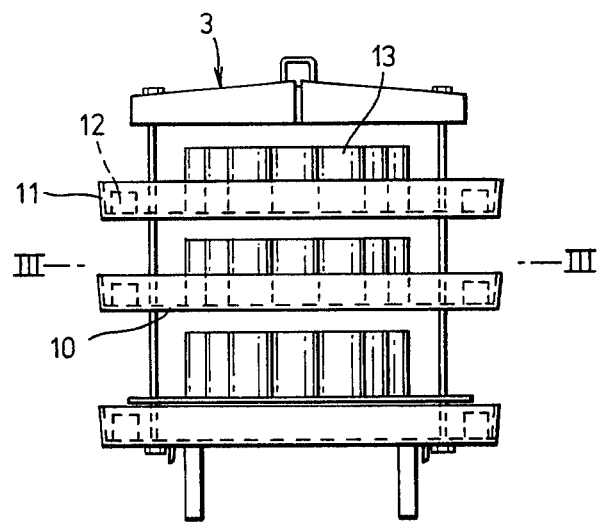
FIG. 2 is a vertical section through a stand used for holding exhaust gas filters being produced.
Figure 3:
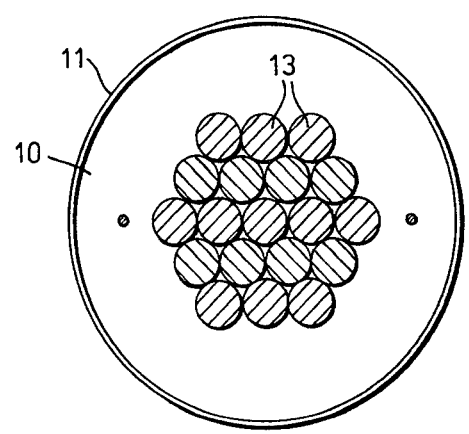
FIG. 3 is a horizontal section through the stand shown in FIG. 2, along the lines III:III.

As shown in greater detail in FIGS. 2 and 3, the stand comprises three shelves (10) which are preferably perforated for free circulation of liquid in the tank. Baskets (11) are provided around the edges of the shelves in order to support blocks of aluminum (12). This would be omitted when the alkali metal aluminate was generated in another vessel. Exhaust gas filters (13) to be coated with aluminum oxide in accordance with the invention are supported on the shelves (10).

In accordance with the embodiment of the invention described in these drawings, the air cylinder (5) is provided in order to enable the stand carrying the exhaust gas filters to be reciprocated vertically within the alkali metal aluminate solution in tank (1). By feeding compressed air along line (5') the cylinder is caused to operate and the stand, carrying filters is raised and lowered as the cylinder operates.

In the specific instance of the plant used in the examples, the tanks (1) and (2) are each built of mild steel and are about four foot six inches in diameter and about seven feet tall. This is a suitable size to enable the coating of batches of fifty exhaust gas filters, each having a capacity of 5½ liters. The specific air cylinder employed had a stroke of about six inches and operated continuously in a 12 second cycle. A swivel hook attachment enabled the stand to rotate slowly in the reacting alkali metal aluminate solution.

The invention is not restricted to such a specific method of bringing about the motion of the filters through the alkali metal hydroxide solutions. For example, instead of subjecting the stand to vertical reciprocation, the stand could instead be reciprocated horizontally in the bath, or alternatively it could be rotated in the bath. In such a case, however, the filters being coated would have to be oriented in such a way as to permit a free flow of the alkali metal aluminate solution through the filters. Various other types of apparatus suitable for moving a stand through a solution are well known in the art and need no particular description.

It is to be emphasized that the function of the air cylinder (5) is to reciprocate the stand within the tank. Apparatus serving only to lower the stand into the tank and to remove it after a period of immersion, the stand not moving during the immersion, would not provide an acceptable coating of the substrates, and the use of such apparatus would not be in accordance with the teachings of this invention.

Although a gas-heated oven (8) is shown in the drawing, other forms of oven for calcining the coated filters can be employed, for instance an electric furnace.

In general, the coating conditions used in accordance with the invention are the same as those that have already been described in the art, for instance in British Pat. No. 1,271,710 referred to above. The substrate is preferably of extended dimensions, and is particularly of a length and geometric surface area substantially greater than that of discrete particles. The substrate employed in the structure of the invention is not restricted to any particular configuration nor to any particular material. The substrate may be formed of a metal or non-metal, although metal is preferred, and may include such materials as steel, stainless steel, alloy steel, iron, iron alloys, nickel, chrome-nickel alloys, aluminum, an aluminum-coated metal or titanium, including sintered metal materials, or refractory or ceramic materials including, for example, high melting glass, refractory metal oxides, e.g. magnesia, alumina, zirconia and silica, or refractory metal silicates or carbides. The configuration of the substrate may include bars, balls, chain, mesh, plates, saddles, sheet, tubes, wire or the like.

Although it is preferred to employ a sodium aluminate solution, it should be understood that other alkali metal aluminate solutions, e.g. potassium aluminate, should also be used.

In accordance with the present invention, it is most convenient to form the sodium aluminate solution by dissolving aluminum metal in sodium hydroxide. The aluminum which is used can be in any convenient form. It is a particular advantage of the process of this invention that it is possible to employ virgin aluminum having a purity of about 99.5%. Such material could not conveniently be used in the heretofore-known processes, because the relatively high content of impurities leads to irregularities in the reaction. It is also possible, however, to use other forms of alumium, such as the more highly purified and expensive S.P. aluminum, which has a purity of about 99.99%. In general any aluminum at least about 99% pure can be used.

The temperatures that can be used in accordance with this embodiment of the process are generally above about 50° C., more preferably in the range from about 80°–100° C. Higher temperatures can, however, be used if desired.

The process previously described is one in which alumina hydrate (Gibbsite) is deposited on a mesh of stainless steel wire wool from a dilute sodium aluminate solution at high temperatures (about 90°–95° C.), the alumina in the solution being replenished continuously by the addition of aluminum metal.

An alternative to dissolving aluminum metal, to produce the desired solution, would be to produce a solution having a high alumina to soda ratio and a high soda concentration by boiling or autoclaving, with recirculation if necessary, strong sodium hydroxide solutions with alumina hydrate (Gibbsite), filtering is necessary, and decomposing the resulting liquor at a convenient temperature in the presence of the stainless steel wool. The maximum alumina to soda ratio which can be tolerated to give a reasonably stable solution varies, the ratio increasing with increasing soda concentration.

Typical solutions, before decomposition would have free soda strengths (as $Na_2O$) from about 60 to 300 grams per litre, initial weight ratios of $Al_2O_3$ to $Na_2O$ in the solution of about 1.3:1 to about 1.67:1 and $Al_2O_3$ concentrations of about 78 to about 500 grams per litre. The optimum strength is approximately 200 grams per litre of $Na_2O$. To obtain the required deposition of alumina hydrate on the surfaces to be coated, the liquors would be decomposed at temperatures from about 60 to about 95° C.

Similar sodium aluminate solutions may be the so-called Bayer liquors, or modifications thereof. Bayer liquor is the sodium aluminate solution produced by treating bauxite or bauxitic clay with caustic soda, in the Bayer Process, according to which aluminum hydroxide or oxide is produced for use as raw material for the production of aluminum metal. The present coating process can be operated using sodium aluminate coating solutions from any or a mixture of above sources.

Although the coating process described can utilize solutions prepared either by dissolving aluminum metal in sodium alkaline hydroxide, or by dissolving alumina hydrate in an alkaline hydroxide, or solutions arising from the Bayer process or a mixture of these sources, the optimum results to data have been obtained by the use of solutions of aluminum metal in an alkaline hydroxide as described.

Although the substrate upon which the aluminum oxide is deposited can vary widely, as indicated above, it has been found most convenient to employ knitted steel wire. One suitable form is a cut wire having a triangular section and variable thickness and strand length. Other forms of knitted steel wire can be obtained, for example a smooth drawn wire which is knitted into a stocking and then rolled into a cylinder of the required thickness and weight.

In general, the thickness of the film of alumina which is deposited should not be less than about 1 mil (about 0.025 mm), and preferably not less than about 4 mils (about 0.1 mm). Deposits of alumina of almost any thickness are possible, but coatings thicker than about 150 mils (about 3.75 mm) are generally not advantageous. Most usually, the thickness of the film will be from about 4–30 mils (about 0.1–0.75 mm).

To show the advantage which is achieved in accordance with the present invention, the following non-limiting Example is provided:

EXAMPLE

About 118 Kg of caustic soda flake was added to about 1135 liters of water. When this had dissolved, the temperature was raised to about 60° C. by live steam injection and about 71.5 Kg of virgin aluminum added on the otherwise empty filter stand. The temperature rose rapidly and effervescence increased until the liquor boiled at about 105° C. The aluminum was removed, the liquor allowed to cool and the dissolution resumed with 20 kilo batches of metal. The temperature remained constant at about 95° C.

The following day the aluminum had all dissolved and a clear aluminate liquor had been produced. The stand was loaded with fifty 5.2 litre wire-filled pre-weighted cases on three tiers and about 24.5 Kg of aluminum were charged to the bottom shelf. The liquor was heated to about 70° C. and the stand was inserted. Water was added until the stand was fully immersed, and the temperature was brought back to about 70° C. During the run the aluminum moved on the shelf, resulting in most of the hydrogen evolved during the run passing through half the cases. Despite the temperature being raised to about 75° C. after eight hours, the total coating cycle took about 27 hours. When the calcined cases were weighed, the spread of weights was considerable, some cases picking up twice as much alumina as others.

For the second experiment, the liquor was made up fresh, but a thin film of alumina hydrate covered the tank walls and the stand. To eliminate the possibility of the aluminum moving as before, the ingots were suspended in expanded metal baskets around the tank wall about halfway between bottom and surface. To reduce the coating time, the reaction temperature was set at about 85° to 90° C.

The reaction was complete in about 24 hours but a considerable variation in coating weights still occurred: i.e. about 42% were within ±10% of the required weight
  about 60% ±15%
  about 75% ±20%
The spread of weights appeared random, but in an attempt to reduce temperature gradients it was decided to operate the steam valve intermittently rather than continuously to eliminate possible temperature gradients. Also as a layer of grease could be seen on the top of the reaction foam all subsequent runs were carried out with degreased cases.

Knitted mesh inserts were used in an attempt to eliminate variations in wire packing density but coating proved very slow—over 24 hours coating time. The weight distribution was again poor, only about 10% falling within ±10% of the mean.

The above sets out the results which are achieved when the apparatus in accordance with the invention is used without the air cylinder to provide vertical reciprocation of the stand. When, however, the experiment is carried out in the same manner, but making use of the air cylinder having a stroke of about six inches and operating on a 12 second cycle, about 80% of the coated filters had within ±10% of the desired weight.

In a further experiment, the size of the filter which was tested was altered. In the experiments detailed above, the filters had a diameter of about 15.75 cm and a length of about 33 cm, and fifty filters were placed on the stand. In the further experiment, eighty filters, each about 45.75 cm long and having an about 10.16 cm by 7.62 cm oval section were packed in two tiers on the stand, and coated as before. About 76% of the coated filters obtained in this way fell within the desired range of ±10% of the desired weight.

The use of the apparatus in accordance with the invention makes it possible to achieve repeated re-use of the alkali metal aluminate solution. No processing problems were observed when ten separate batches of filter were coated on ten successive days. The efficiency of utilization of the aluminum was about 75-80% throughout the series, for virgin aluminum and about 90% for S.P. aluminum. No significant decrease in efficiency was noticed as the age of the reaction liquor increased. Losses of sodium hydroxide over the period were low and topping up with sodium hydroxide was required only each week.

The distribution of coating weight varied, but overall more than about 70% of the filters fell within 10% of the desired weight.

Numerous substitutions, modifications, and changes can be made in the above defined process without departing from the inventive concept. The scope of the invention can, however, best be understood with reference to the following claims.

We claim:

1. A method for the production of exhaust gas filters comprising aluminum oxide produced by the decomposition of alumina hydrate deposited on a substrate contained within a metal casing, in which said alumina hydrate is deposited from an alkali metal aluminate solution, which comprises mounting a plurality of said substrates upon a stand therefor, immersing said stand in said alkali metal aluminate solution, and subjecting said stand to vertical or horizontal reciprocating motion or rotating motion or a vector combination of said motions through said alkali metal aluminate solution whereby said alkali metal aluminate solution is caused to flow over and through said substrates while alumina hydrate is deposited on said substrates.

2. A method as claimed in claim 1 wherein the alkali metal aluminate solution is obtained by dissolving an aluminum source selected from aluminum metal, alumina hydrate, bauxite and bauxitic clay, in an alkali metal hydroxide solution.

3. A method as claimed in claim 1 wherein said stand is reciprocated vertically within said alkali metal aluminate solution.

4. A method as claimed in claim 2 wherein said aluminum metal is at least about 99% pure.

5. A method as claimed in claim 1 wherein said alkali metal aluminate solution is sodium aluminate solution.

6. A method as claimed in claim 5 wherein said sodium aluminate solution has a free soda strength (as $Na_2O$) of from about 60 to about 300 grams per liter.

7. A method as claimed in claim 6 wherein said sodium aluminate solution has an $Al_2O_3$ concentration of from about 78 to about 500 grams per liter.

8. A method as claimed in claim 5 wherein said sodium aluminate solution exhibits an initial weight ratio of $Al_2O_3$ to $Na_2O$ of from about 1.3:1 to about 1.67:1.

9. A method as claimed in claim 1 wherein said alumina hydrate is deposited on said metal wire at a temperature from about 60 to about 95° C.

10. In a method for the production of exhaust gas filters comprising aluminum oxide produced by the decomposition of alumina hydrate deposited on a substrate contained within a metal casing, in which said alumina hydrate is deposited from an alkali metal aluminate solution, by mounting a plurality of said substrates upon a stand therefor, immersing said stand in said alkali metal aluminate solution, and depositing alumina hydrate on said substrate, the improvement which comprises subjecting said stand to vertical or horizontal reciprocating motion or rotating motion or a vector combination of said motions through said alkali metal aluminate solution whereby said alkali metal aluminate solution is caused to flow over and through said substrates while alumina hydrate is deposited on said substrates.

11. A method as claimed in claim 10 wherein the alkali metal aluminate solution is obtained by dissolving an aluminum source selected from aluminum metal, alumina hydrate, bauxite and bauxitic clay in an alkali metal hydroxide solution.

12. A method as claimed in claim 10 wherein said stand is reciprocated vertically within said alkali metal aluminate solution.

13. A method as claimed in claim 11 wherein said aluminum metal is at least about 99% pure.

14. A method as claimed in claim 10 wherein said alkali metal aluminate solution is sodium aluminate solution.

15. A method as claimed in claim 14 wherein said sodium aluminate solution has a free soda strength (as $Na_2O$) of from about 60 to about 300 grams per liter.

16. A method as claimed in claim 15 wherein said sodium aluminate solution has an $Al_2O_3$ concentration of from about 78 to about 500 grams per liter.

17. A method as claimed in claim 14 wherein the sodium aluminate solution exhibits an initial weight ratio of $Al_2O_3$ to $Na_2O$ of from about 1.3:1 to about 1.67:1.

18. A method as claimed in claim 10 wherein the alumina hydrate is deposited on the metal wire at a temperature from about 60 to about 95° C.

19. A method for the production of exhaust gas filters comprising aluminum oxide produced by the decomposition of alumina hydrate deposited on a substrate contained within a metal casing, in which said alumina hydrate is deposited, at a temperature of from about 60 to about 95° C., from a sodium aluminate solution having a free soda strength (as $Na_2O$) of from about 60 to about 300 grams per liter, an $Al_2O_3$ concentration of from about 78 to about 500 grams per liter, and an initial weight ratio of from about 1.3:1 to about 1.67:1, said sodium aluminate solution being obtained by dissolving an aluminum source selected from aluminum metal at least about 99% pure, alumina hydrate, bauxite and bauxitic clay in a sodium hydroxide solution, which method comprises mounting a plurality of said substrates upon a stand therefore, immersing said stand in said sodium aluminate solution, and vertically reciprocating said stand through said alkali metal aluminate solution whereby said sodium aluminate solution is caused to flow over and through said substrates while alumina hydrate is deposited on said substrates.

* * * * *